United States Patent
Li et al.

(10) Patent No.: US 11,157,593 B2
(45) Date of Patent: *Oct. 26, 2021

(54) APPARATUS AND METHODS FOR COMBINING VECTORS

(71) Applicant: Cambricon Technologies Corporation Limited, Beijing (CN)

(72) Inventors: Zhen Li, Beijing (CN); Xiao Zhang, Beijing (CN); Shaoli Liu, Beijing (CN); Tianshi Chen, Beijing (CN); Yunji Chen, Beijing (CN)

(73) Assignee: Cambricon Technologies Corporation Limited, Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/171,279

(22) Filed: Oct. 25, 2018

(65) Prior Publication Data

US 2019/0065435 A1 Feb. 28, 2019

Related U.S. Application Data

(63) Continuation-in-part of application No. PCT/CN2016/080963, filed on May 4, 2016.

(30) Foreign Application Priority Data

Apr. 26, 2016 (CN) .......................... 201610267021.9

(51) Int. Cl.
*G06F 17/16* (2006.01)
*G06F 9/30* (2018.01)
(Continued)

(52) U.S. Cl.
CPC .......... *G06F 17/16* (2013.01); *G06F 9/30036* (2013.01); *G06F 9/3887* (2013.01);
(Continued)

(58) Field of Classification Search
None
See application file for complete search history.

(56) References Cited

U.S. PATENT DOCUMENTS

| 2015/0143086 A1* | 5/2015 | Khan | G06F 9/30181 |
| | | | 712/226 |
| 2015/0220833 A1* | 8/2015 | Le | G06F 16/583 |
| | | | 706/16 |

(Continued)

FOREIGN PATENT DOCUMENTS

| CN | 1349159 A | 5/2002 |
| CN | 101833468 A | 9/2010 |

(Continued)

OTHER PUBLICATIONS

Gehringer, G.Q. Kenny, CSC 506—Lecture 7—Vector Processors. Summer 1999 (Year: 1999).*

(Continued)

*Primary Examiner* — Hyun Nam
(74) *Attorney, Agent, or Firm* — Getech Law LLC; Jun Ye

(57) ABSTRACT

Aspects for vector combination in neural network are described herein. The aspects may include a direct memory access unit configured to receive aa first vector, a second vector, and a controller vector. The first vector, the second vector, and the controller vector may each include one or more elements indexed in accordance with a same one-dimensional data structure. The aspects may further include a computation module configured to select one of the one or more control values, determine that the selected control value satisfies a predetermined condition, and select one of the one or more first elements that corresponds to the selected control value in the one-dimensional data structure (Continued)

as an output element based on a determination that the selected control value satisfies the predetermined condition.

28 Claims, 4 Drawing Sheets

(51) Int. Cl.
    *G06F 15/80* (2006.01)
    *G06F 9/38* (2018.01)
    *G06N 3/08* (2006.01)
    *G06N 3/063* (2006.01)

(52) U.S. Cl.
    CPC ...... *G06F 15/8069* (2013.01); *G06F 15/8076* (2013.01); *G06N 3/063* (2013.01); *G06N 3/08* (2013.01)

(56) References Cited

U.S. PATENT DOCUMENTS

| | | | | |
|---|---|---|---|---|
| 2015/0363688 | A1* | 12/2015 | Gao | G06F 16/9032 706/27 |
| 2017/0011257 | A1* | 1/2017 | Mikhael | G06K 9/6214 |
| 2017/0103338 | A1* | 4/2017 | Zhang | G06F 40/30 |

FOREIGN PATENT DOCUMENTS

| | | | |
|---|---|---|---|
| CN | 102156637 A | 8/2011 | |
| CN | 102495724 A | 6/2012 | |
| CN | 105229599 A | 1/2016 | |
| WO | WO 2017/185385 A1 | 11/2017 | |

OTHER PUBLICATIONS

Professor David A. Patterson, Computer Science 252—Lecture 6—Vector Processing, Spring 1998 (Year: 1998).*
201610267021.9—Office Action, dated Aug. 2, 2019, 10 pages. (no English translation).
PCT/CN2016/080963—International Search Report, dated Jan. 24, 2017, 9 pages. (no English translation).
T. Chen, et al., "A Small-Footprint Accelerator for Large-Scale Neural Networks", ACM Transactions on Computer Systems, vol. 33, No. 2, Article 6, May 2015, 27 pages.
Z. Du, et al., "An Accelerator for High Efficient Vision Processing", IEEE Transactions on Computer-aided Design of Integrated Circuits and System, vol. 36, No. 2, Feb. 2017, pp. 227-240.
S. Liu, et al., "Cambricon: An Instruction Set Architecture for Neural Networks", 2016 ACM/IEEE 43rd Annual International Symposium on Computer Architecture, Oct. 12, 2016, pp. 393-405.
S. Zhang, et al., "Cambricon-X" An Accelerator for Sparse Neural Networks, The 49th Annual IEEE/ACM International Symposium on Microarchitecture Article No. 20, Oct. 15, 2016, 12 pages.
Y. Chen, et al., "DaDianNao: A Machine-Learning Supercomputer", 2014 47th Annual IEEE/ACM International Symposium on Microarchitecture, Dec. 13, 2014, pp. 609-622.
T. Luo, et al., "DaDianNao: A Neural Network Supercomputer", IEEE Transaction on Computers, vol. 66, No. 1, Jan. 2017, pp. 73-88.
T. Chen, et al., "DianNao: A Small-Footprint High-Throughput Accelerator for Ubiquitous Machine-Learning", ASPLOS '14, Proceedings of the 19th international conference on Architectural support for programming languages and operating systems, Feb. 24, 2014, pp. 269-283.
Y. Chen, et al., "DianNao Family: Energy-Efficient Hardware Accelerators for Machine Learning", Communications of the ACM, vol. 59, No. 11, Nov. 2016, pp. 105-112.
D. Liu, et al., "PuDianNao: A Polyvalent Machine Learning Accelerator", ASPLOS '15 Proceedings of the Twentieth International Conference on Architectural Support for Programming Languages and Operating Systems, Mar. 14, 2015, pp. 369-381.
Z. Du, et al., "ShiDianNao: Shifting Vision Processing Closer to the Sensor", ISCA '15 Proceedings of the 42nd Annual International Symposium on Computer Architecture, Jun. 13, 2015, pp. 92-104.
CN201610261021.9, Official Action dated Jan. 22, 2020, 7 Pages (No English translation).

* cited by examiner

APPARATUS AND METHODS FOR COMBINING VECTORS

CROSS-REFERENCE TO RELATED APPLICATIONS

The present invention is a continuation-in-part of PCT Application No. PCT/CN2016/080,963, filed on May 4, 2016, which claims priority to commonly owned CN application number 201610267021.9, filed on Apr. 26, 2016. The entire contents of each of the aforementioned applications are incorporated herein by reference.

BACKGROUND

Multilayer neural networks (MNN) are widely applied to the fields such as pattern recognition, image processing, functional approximation and optimal computation. In recent years, due to the higher recognition accuracy and better parallelizability, multilayer artificial neural networks have received increasing attention by academic and industrial communities. More specifically, combining two vectors may be performed frequently in deep learning processes in MMNs.

A known method to combine vectors of a multilayer artificial neural network is to use a general-purpose processor. However, one of the defects of the method is low performance of a single general-purpose processor which cannot meet performance requirements for usual multilayer neural network operations. When multiple general-purpose processors execute concurrently, the intercommunication among them also becomes a performance bottleneck.

Another known method to combine vectors of the multilayer artificial neural network is to use a graphics processing unit (GPU). Such a method uses a general-purpose register file and a general-purpose stream processing unit to execute general purpose single-instruction-multiple-data (SIMD) instructions to support the algorithms in MNNs. However, since GPU only contains rather small on-chip caching, then model data of a multilayer artificial neural network may be repeatedly moved from the off-chip, and off-chip bandwidth becomes a main performance bottleneck, causing huge power consumption.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

One example aspect of the present disclosure provides an example apparatus for vector combination in a neural network. The example apparatus may include a direct memory access unit configured to receive a first vector, a second vector, and a controller vector. The first vector, the second vector, and the controller vector may include elements indexed in accordance with a same one-dimensional data structure. The example apparatus may further include a computation module configured to select one of the one or more control values, determine that the selected control value satisfies a predetermined condition, and select one of the one or more first elements that corresponds to the selected control value in the one-dimensional data structure as an output element based on a determination that the selected control value satisfies the predetermined condition.

Another example aspect of the present disclosure provides an example method for vector combination in a neural network. The example method may include receiving, by a direct memory access unit, a first vector, a second vector, and a controller vector, selecting, by a computation module, one of the one or more control values; determining, by the computation module, that the selected control value satisfies a predetermined condition; selecting, by the computation module, one of the one or more first elements that corresponds to the selected control value in the one-dimensional data structure as an output element based on a determination that the selected control value satisfies the predetermined condition.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Various aspects are now described with reference to the drawings. In the following description, for purpose of explanation, numerous specific details are set forth in order to provide a thorough understanding of one or more aspects. It may be evident, however, that such aspect(s) may be practiced without these specific details.

In the present disclosure, the term "comprising" and "including" as well as their derivatives mean to contain rather than limit; the term "or", which is also inclusive, means and/or.

In this specification, the following various embodiments used to illustrate principles of the present disclosure are only for illustrative purpose, and thus should not be understood as limiting the scope of the present disclosure by any means. The following description taken in conjunction with the accompanying drawings is to facilitate a thorough understanding to the illustrative embodiments of the present disclosure defined by the claims and its equivalent. There are specific details in the following description to facilitate understanding. However, these details are only for illustrative purpose. Therefore, persons skilled in the art should understand that various alternation and modification may be made to the embodiments illustrated in this description without going beyond the scope and spirit of the present disclosure. In addition, for clear and concise purpose, some known functionality and structure are not described. Besides, identical reference numbers refer to identical function and operation throughout the accompanying drawings.

A combination of two vectors of a same length may be performed in a neural network. A vector may refer to one or more values formatted in a one-dimensional data structure. The values included in a vector may be referred to as elements. A first vector may be represented as (A(1), A(2) . . . A(n)). The first vector may be denoted as "first vector A" hereafter. A second vector may be represented as (B(1), B(2) . . . B(n)). The second vector may be denoted as "second vector B" hereafter. As shown, the first vector A and the second vector B each may include same number of elements, e.g., n.

Figure 1:
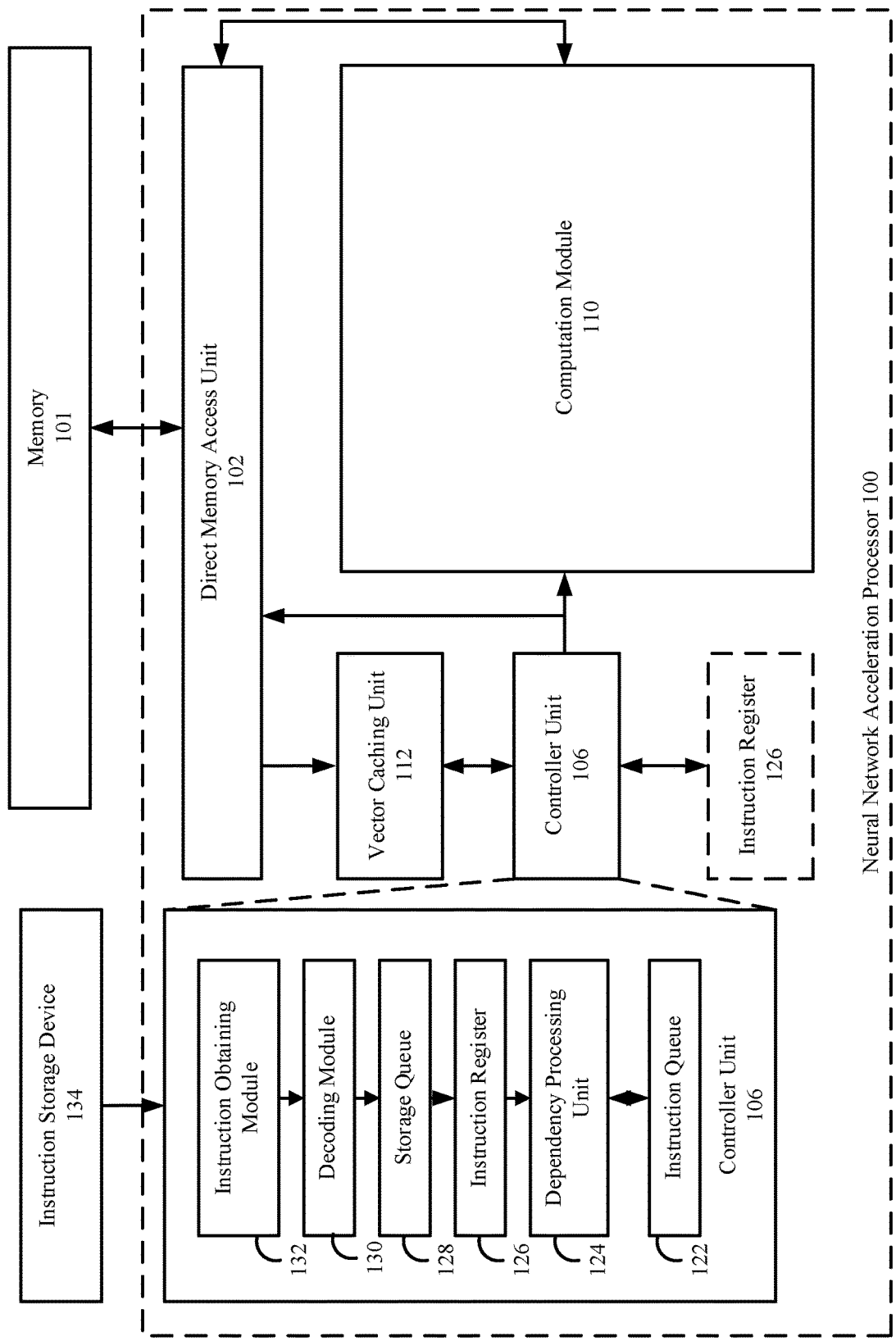
FIG. 1 illustrates a block diagram of an example neural network acceleration processor by which vector combination may be implemented in a neural network.

FIG. 1 illustrates a block diagram of an example neural network acceleration processor by which vector combination may be implemented in a neural network.

As depicted, the example neural network acceleration processor 100 may include a controller unit 106, a direct memory access unit 102, a computation module 110, and a vector caching unit 112. Any of the above-mentioned components or devices may be implemented by a hardware circuit (e.g., application specific integrated circuit (ASIC), Coarse-grained reconfigurable architectures (CGRAs), field-programmable gate arrays (FPGAs), analog circuits, memristor, etc.). The example neural network acceleration processor 100 is not limited to the structure described herein in accordance with FIG. 1.

In some examples, a vector combination instruction may originate from an instruction storage device 134 to the controller unit 106. An instruction obtaining module 132 may be configured to obtain a vector combination instruction from the instruction storage device 134 and transmit the instruction to a decoding module 130.

The decoding module 130 may be configured to decode the instruction. The instruction may include one or more operation fields that indicate parameters for executing the instruction. The parameters may refer to identification numbers of different registers ("register ID" hereinafter) in the instruction register 126. Thus, by modifying the parameters in the instruction register 126, the neural network acceleration processor 100 may modify the instruction without receiving new instructions. The decoded instruction may be transmitted by the decoding module 130 to an instruction queue module 128. In some other examples, the one or more operation fields may store immediate values such as addresses in the memory 101 and a scalar value, rather than the register IDs.

The instruction queue module 128 may be configured to temporarily store the received instruction and/or one or more previously received instructions. Further, the instruction queue module 128 may be configured to retrieve information according to the register IDs included in the instruction from the instruction register 126.

For example, the instruction queue module 128 may be configured to retrieve information corresponding to operation fields in the instruction from the instruction register 126. Information for the operation fields in a vector combination instruction, for example, may include an address of the first vector A, an address of the second vector B, a length (or a bit length) of the first vector A and the second vector B, an address of a controller vector, and an address of an output vector in the memory 101. Once the relevant values are retrieved, the instruction may be sent to a dependency processing unit 124.

The dependency processing unit 124 may be configured to determine whether the instruction has a dependency relationship with the data of the previous instruction that is being executed. This instruction may be stored in the storage queue module 122 until it has no dependency relationship on the data with the previous instruction that has not finished executing. If the dependency relationship does not exist, the controller unit 106 may be configured to decode the instruction into micro-instructions for controlling operations of other modules including the direct memory access unit 102 and the computation module 110.

The direct memory access unit 102 may be configured to access an external address range (e.g., in an external storage device such as a memory 101) and directly read or write vector data into respective caching units in the computation module 110 in accordance with the received instruction.

Hereinafter, a caching unit (e.g., the vector caching unit 112 etc.) may refer to an on-chip caching unit integrated in the neural network acceleration processor 100, rather than other storage devices in memory 101 or other external devices. In some examples, the on-chip caching unit may be implemented as a register file, an on-chip buffer, an on-chip Static Random Access Memory (SRAM), or other types of on-chip storage devices that may provide higher access speed than the external memory. In some other examples, the instruction register 126 may be implemented as a scratchpad memory, e.g., Dynamic random-access memory (DRAM), embedded DRAM (eDRAM), memristor, 3D-DRAM, non-volatile memory, etc.

Upon receiving the vector combination instruction from the controller unit 106 and the vectors from the vector caching unit 112, the computation module 110 may be configured to determine each of the control values included in the controller vector satisfies a predetermined vector. For example, the computation module 110 may be configured to select a control value from the controller vector and determine if the selected control value is a binary value that indicates true, e.g., 1. If the control value is 1, the computation module 110 may be configured to select a corresponding element in the first vector that is associated with a same index as the control value. If the control value is 0, the computation module 110 may be configured to select a corresponding element in the second vector that is associated with the same index. The selected elements may be combined to generate an output vector as an operation result of the vector combination operation.

Figure 2:
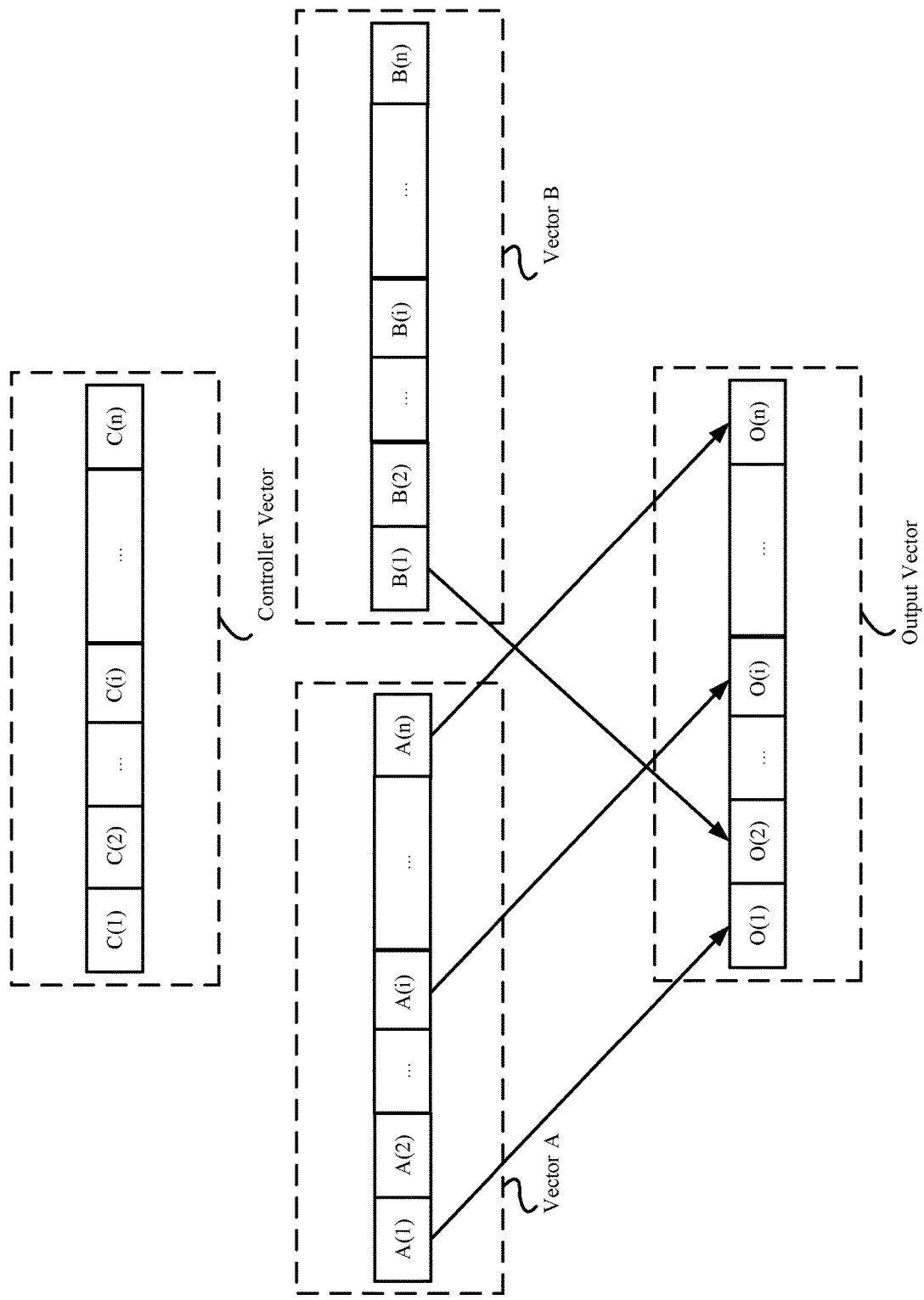
FIG. 2 illustrates an example vector combination of two vectors that may be performed by the example neural network acceleration processor.

FIG. 2 illustrates an example vector combination of two vectors that may be performed by the example neural network acceleration processor 100.

As depicted, a controller vector may include one or more controller values denoted respectively as C(1), C(2), . . . C(n). The first vector A may include one or more first elements denoted as A(1), A(2), . . . A(n) and the second vector B may include one or more second elements denoted as B(1), B(2), . . . B(n).

With respect an output element in an output vector, e.g., O(i), the computation module 110 may be configured to determine if the control value associated with a same index, e.g., C(i), satisfies a predetermined condition. For example, the computation module 110 may be configured to determine if C(i) is a binary value that indicates true, e.g., 1. If the control value C(i) is 1, the computation module 110 may be configured to select a corresponding element in the first vector, e.g., A(i), as the output element O(i). If the control value is 0, the computation module 110 may be configured to select a corresponding element in the second vector B, e.g., B(i), as the output element O(i). Other output elements may be determined similarly and combined into the output vector.

Figure 3:
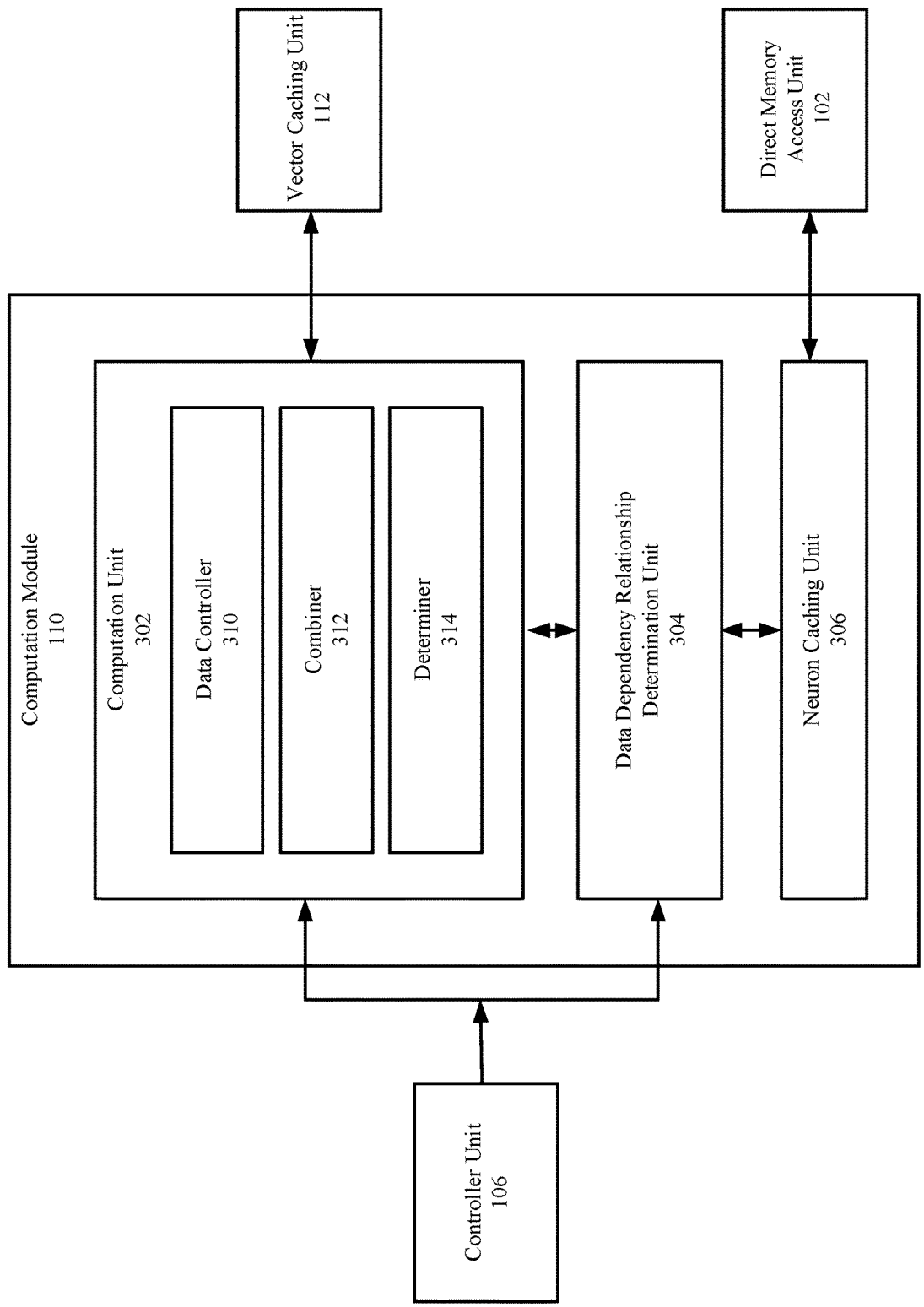
FIG. 3 illustrates an example computation module in the example neural network acceleration processor by which vector combination may be implemented in a neural network.

FIG. 3 illustrates an example computation module 110 in the example neural network acceleration processor 100 by which vector combination may be implemented in a neural network. As depicted, the example computation module 110 may include a computation unit 302, a data dependency relationship determination unit 304, a neuron caching unit 306. The computation unit 302 may further include a data controller 310, a merger 312, and a determiner 314. The example computation module 110 is not limited to the structure described herein in accordance with FIG. 3.

The data dependency relationship determination unit 304 may be configured to perform data access operations (e.g., reading or writing operations) on the caching units including the neuron caching unit 306 during the computation process. The data dependency relationship determination unit 304 may be configured to prevent conflicts in reading and writing of the data in the caching units. For example, the data dependency relationship determination unit 304 may be configured to determine whether there is dependency relationship in terms of data between a micro-instruction which to be executed and a micro-instruction being executed. If no dependency relationship exists, the micro-instruction may be allowed to be executed; otherwise, the micro-instruction may not be allowed to be executed until all micro-instructions on which it depends have been executed completely. The dependency relationship may be determined when a target operation range of the micro-instruction to be executed overlaps a target operation range of a micro-instruction being executed. For example, all micro-instructions sent to the data dependency relationship determination unit 304 may be stored in an instruction queue within the data dependency relationship determination unit 304. The instruction queue may indicate the relative priorities of the stored micro-instructions. In the instruction queue, if the target operation range of reading data by a reading instruction conflicts with or overlaps the target operation range of writing data by a writing instruction of higher priority in the front of the instruction queue, then the reading instruction may not be executed until the writing instruction is executed.

The neuron caching unit 306 may be configured to store the elements in the first vector A, the second vector B, and the controller vector.

The computation unit 302 may be configured to receive the micro-instructions decoded from the vector comparison instruction from the controller unit 106. In the example that the micro-instructions instruct the computation module 110 to perform a vector combination between the first vector A and the second vector B, the data controller 310 may be configured to select a control value in the controller vector. For example, the data controller 310 may be configured sequentially select the control values from C(1) to C(n).

The determiner 314 may be configured to determine if the control value satisfies a predetermined condition, e.g., if the control value is 1. If the control value is 1, the computation module 110 may be configured to select a corresponding element in the first vector as the output element. If the control value is 0, the computation module 110 may be configured to select a corresponding element in the second vector B as the output element.

The combiner 312 may then be configured to combine the output elements as an output vector.

Figure 4:
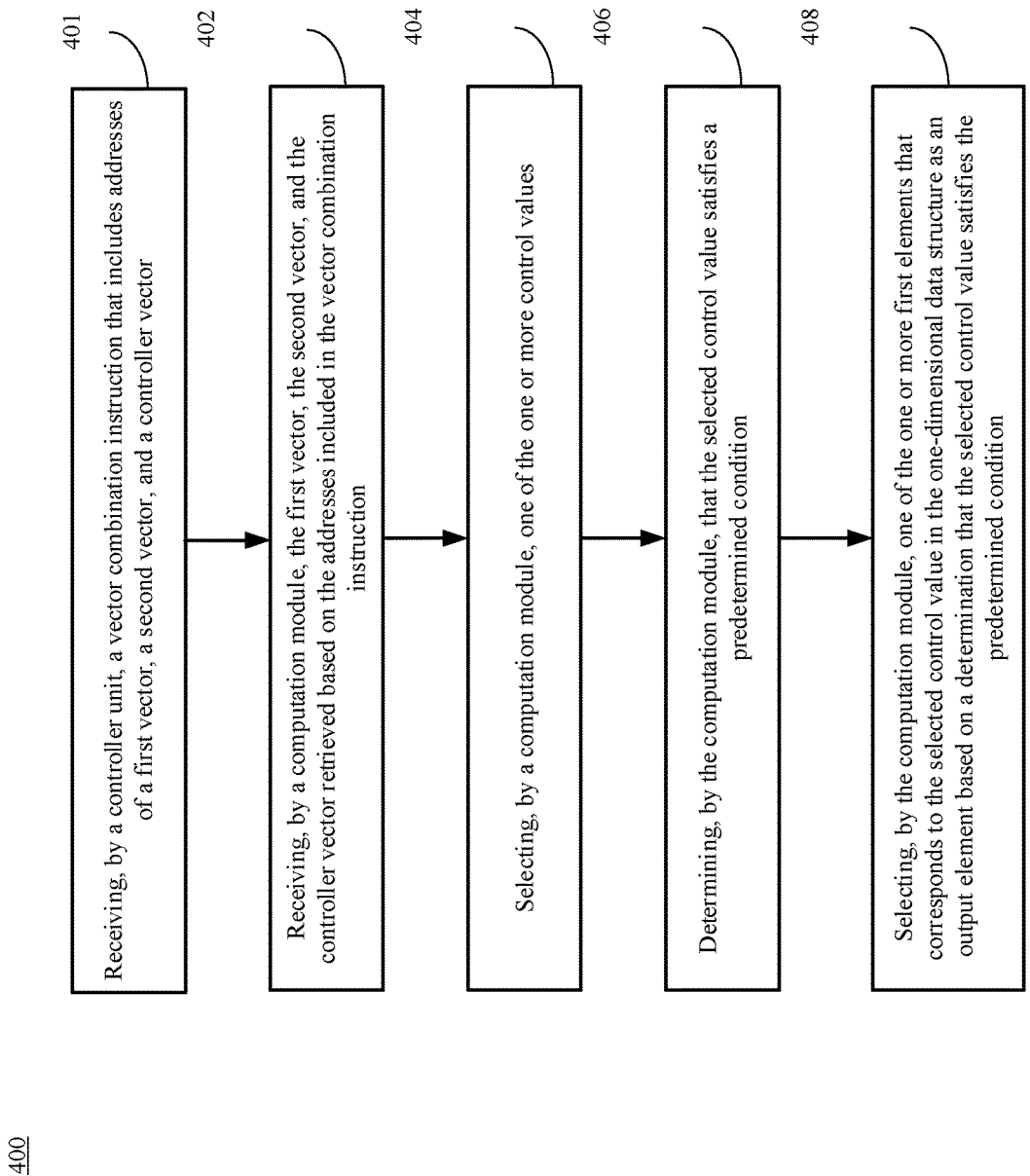
FIG. 4 illustrates flow chart of an example method for vector combination in a neural network.

FIG. 4 illustrates flow chart of an example method 400 for vector combination in a neural network. The method 400 may be performed by one or more components of the apparatus of FIGS. 1 and 3.

At block 401, the example method 400 may include receiving, by a controller unit, a vector combination instruction that includes addresses of a first vector, a second vector, and a controller vector. For example, the controller unit 106 may be configured to receive a vector combination instruction from the instruction storage device 134. A vector combination instruction may include an address of the first vector A, an address of the second vector B, a length (or a bit length) of the first vector A and the second vector B, an address of a controller vector, and an address of an output vector in the memory 101.

In some other examples, the first vector A and the second vector B may be of different lengths. The controller unit 106 may be configured to supplement one or more bits of zero values to the shorter vector between the first vector and the second vector B such that the supplemented vector may be of a same length as the other vector.

At block 402, the example method 400 may include receiving, by a computation module, the first vector, the second vector, and the controller vector retrieved based on the addresses included in the vector combination instruction. For example, the computation module 110 may be configured to receive the first vector, the second vector, and the controller vector via the direct memory access unit 102 from the memory 101. As described in accordance with FIG. 2, the first vector A may include one or more first elements denoted as A(1), A(2), . . . A(n) and the second vector B may include one or more second elements denoted as B(1), B(2), . . . B(n). Similarly, the controller vector may include one or more controller values denoted respectively as C(1), C(2), . . . C(n).

At block 404, the example method 400 may include selecting, by a computation module, one of the one or more control values. For example, the data controller 310 of the computation unit 302 may be configured select a control value, e.g., C(i).

At block 406, the example method 400 may include determining, by the computation module, that the selected control value satisfies a predetermined condition. For example, the determiner 314 of the computation unit 302 may be configured to determine if the control value satisfies a predetermined condition. For example, the determiner 314 may be configured to determine if C(i) is a binary value that indicates true, e.g., 1.

At block 408, the example method 400 may include selecting, by the computation module, one of the one or more first elements that corresponds to the selected control value in the one-dimensional data structure as an output element based on a determination that the selected control value satisfies the predetermined condition. For example, if the determiner 314 determines that the control value C(i) is 1, the computation module 110 may be configured to select a corresponding element in the first vector, e.g., A(i), as the output element O(i). If the control value is 0, the computation module 110 may be configured to select a corresponding element in the second vector B, e.g., B(i), as the output element O(i). Other output elements may be determined similarly and combined into the output vector.

The process or method described in the above accompanying figures can be performed by process logic including hardware (for example, circuit, specific logic etc.), firmware, software (for example, a software being externalized in non-transitory computer-readable medium), or the combination of the above two. Although the process or method is described above in a certain order, it should be understood that some operations described may also be performed in different orders. In addition, some operations may be executed concurrently rather than in order.

In the above description, each embodiment of the present disclosure is illustrated with reference to certain illustrative embodiments. Apparently, various modifications may be made to each embodiment without going beyond the wider spirit and scope of the present disclosure presented by the affiliated claims. Correspondingly, the description and accompanying figures should be understood as illustration only rather than limitation. It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described herein that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

We claim:

1. An apparatus for vector combination in a neural network, comprising:
   a controller circuit configured to receive a vector combination instruction that includes addresses of a first vector, a second vector, a controller vector, and an operation code that indicates an operation to combine the first vector and the second vector;
   a computation circuit configured to:
      receive the first vector, the second vector, and the controller vector retrieved based on the addresses included in the vector combination instruction,
         wherein the first vector includes one or more first elements indexed in accordance with a one-dimensional data structure,
         wherein the second vector includes one or more second elements indexed in accordance with the one-dimensional data structure, and
         wherein the controller vector includes one or more control values indexed in accordance with the one-dimensional data structure,
      select one of the one or more control values,
      determine that the selected control value satisfies a predetermined condition,
      select one of the one or more first elements that corresponds to the selected control value in the one-dimensional data structure as an output element based on a determination that the selected control value satisfies the predetermined condition, and
      select one of the one or more second elements that corresponds to the selected control value in the one-dimensional data structure as the output element based on a determination that the selected control value does not satisfy the predetermined condition.

2. The apparatus of claim 1, wherein the computation circuit is further configured to combine the output elements into an output vector.

3. The apparatus of claim 1, wherein the predetermined condition is that the selected control value is a predetermined value.

4. The apparatus of claim 1, wherein the vector combination instruction includes a first length of the first vector.

5. The apparatus of claim 4, wherein the vector combination instruction includes a second length of the second vector.

6. The apparatus of claim 5, further comprising a caching circuit configured to store the first vector, the second vector, an output vector, and the controller vector.

7. The apparatus of claim 5, further comprising a register file configured to store an address of the controller vector, an address of the first vector, an address of the second vector, and an address of an output vector.

8. The apparatus of claim 1, wherein the computation circuit is further configured to determine that the selected control value does not satisfy the predetermined condition.

9. The apparatus of claim 1, wherein the controller circuit comprises an instruction obtaining circuit configured to obtain the vector combination instruction from an instruction storage device.

10. The apparatus of claim 9, wherein the controller circuit further comprises a decoding circuit configured to decode the vector combination instruction into one or more micro-instructions.

11. The apparatus of claim 10, wherein the controller circuit further comprises an instruction queue circuit configured to temporarily store the vector combination instruction and one or more previously received instructions, and retrieve information corresponding to operation fields in the vector combination instruction.

12. The apparatus of claim 11, wherein the controller circuit further comprises an instruction register configured to store the information corresponding to the operation fields in the vector combination instruction.

13. The apparatus of claim 12, wherein the controller circuit further comprises a dependency processing circuit configured to determine whether the vector combination instruction has a dependency relationship with the one or more previously received instructions.

14. The apparatus of claim 13, wherein the controller circuit further comprises a storage queue circuit configured to store the vector combination instruction while the dependency processing circuit is determining whether the vector combination instruction has the dependency relationship with the one or more previously received instructions.

15. A method for vector combination in a neural network, comprising:
   receiving, by a controller circuit, a vector combination instruction that includes addresses of a first vector, a second vector, a controller vector, and an operation code that indicates an operation to combine the first vector and the second vector;

receiving, by a computation circuit, the first vector, the second vector, and the controller vector retrieved based on the addresses included in the vector combination instruction, wherein the first vector includes one or more first elements indexed in accordance with a one-dimensional data structure, wherein the second vector includes one or more second elements indexed in accordance with the one-dimensional data structure, and wherein the controller vector includes one or more control values indexed in accordance with the one-dimensional data structure;

selecting, by the computation circuit, one of the one or more control values;

determining, by the computation circuit, that the selected control value satisfies a predetermined condition;

selecting, by the computation circuit, one of the one or more first elements that corresponds to the selected control value in the one-dimensional data structure as an output element based on a determination that the selected control value satisfies the predetermined condition; and selecting, by the computation circuit, one of the one or more second elements that corresponds to the selected control value in the one-dimensional data structure as the output element based on a determination that the selected control value does not satisfy the predetermined condition.

16. The method of claim 15, further comprising combining, by the computation circuit, the output elements into an output vector.

17. The method of claim 15, wherein the predetermined condition is that the selected control value is a predetermined value.

18. The apparatus of claim 15, wherein the vector combination instruction includes a first length of the first vector.

19. The apparatus of claim 18, wherein the vector combination instruction includes a second length of the second vector.

20. The method of claim 15, further comprising storing, by a caching circuit, the first vector, the second vector, an output vector, and the controller vector.

21. The method of claim 15, further comprising storing, by a register file, an address of the controller vector, an address of the first vector, an address of the second vector, and an address of an output vector.

22. The method of claim 15, further comprising determining, by the computation circuit, that the selected control value does not satisfy the predetermined condition.

23. The method of claim 15, further comprising obtaining, by an instruction obtaining circuit of the controller circuit, the vector combination instruction from an instruction storage device.

24. The method of claim 23, further comprising decoding, by a decoding circuit of the controller circuit, the vector combination instruction into one or more micro-instructions.

25. The method of claim 24, further comprising temporarily storing, by an instruction queue circuit of the controller circuit, the vector combination instruction and one or more previously received instructions, and retrieve information corresponding to operation fields in the vector combination instruction.

26. The method of claim 25, further comprising storing, by an instruction register of the controller circuit, the information corresponding to the operation fields in the vector combination instruction.

27. The method of claim 26, further comprising determining, by a dependency processing circuit of the controller circuit, whether the vector combination instruction has a dependency relationship with the one or more previously received instructions.

28. The method of claim 27, further comprising storing, by a storage queue circuit of the controller circuit, the vector combination instruction while the dependency processing circuit is determining whether the vector combination instruction has the dependency relationship with the one or more previously received instructions.

* * * * *